United States Patent [19]

Tekeyan

[11] Patent Number: 4,984,844
[45] Date of Patent: Jan. 15, 1991

[54] SAFETY KEY FOR TOOLROOM LATHE CHUCK

[76] Inventor: Haig Tekeyan, 24 Doty St., Waltham, Mass. 02154

[21] Appl. No.: 194,486

[22] Filed: May 16, 1988

[51] Int. Cl.⁵ ............................................. B25B 13/44
[52] U.S. Cl. ..................................... 279/1 K; 81/16; 81/436; 81/60; 408/241 R
[58] Field of Search .................... 279/1 K; 408/241 R, 408/710; 81/436, 451, 16, 58.4, 59.1–632; 267/73, 173

[56] References Cited

U.S. PATENT DOCUMENTS

| | | | |
|---|---|---|---|
| 1,506,331 | 8/1924 | Benko | 279/16 X |
| 2,690,690 | 10/1954 | Garton | 81/16 |
| 3,424,212 | 1/1969 | Kemper | 81/436 |
| 4,706,415 | 11/1987 | Okada et al. | 51/165.71 X |
| 4,781,083 | 11/1988 | Cummings | 81/63.1 |

FOREIGN PATENT DOCUMENTS 464937  5/1950  Canada ............................ 279/1 K Primary Examiner—Z. R. Bilinsky
Assistant Examiner—Robert Schultz
Attorney, Agent, or Firm—Schiller, Pandiscio & Kusmer

[57] ABSTRACT

A safety key for a toolroom lathe chuck having (1) a housing having a top end, a bottom end and an internal bore opening on the bottom end and extending towards the top end, (2) a sleeve concentrically surrounding said housing and axially slidable thereon between a first position and a second position, (3) a handle connected to and extending transversely to the top end of the housing, (4) a key member sized to be movably received in the internal bore of the housing at the bottom end thereof, (5) securing apparatus for securing the key member to the sleeve, (6) a spring for biasing the sleeve into its first position when no axially downward pressure is applied to the sleeve, whereby the key member will be completely withdrawn into the internal bore of the housing, and (7) a lever attached to the handle for applying axially downward pressure to said sleeve, the lever being adapted to provide such downward pressure to the sleeve when the lever is moved towards the handle, whereby the sleeve may be moved axially downward along the housing from its first position towards its second extended position so that the bottom end of the key member will protrude from the housing.

24 Claims, 3 Drawing Sheets

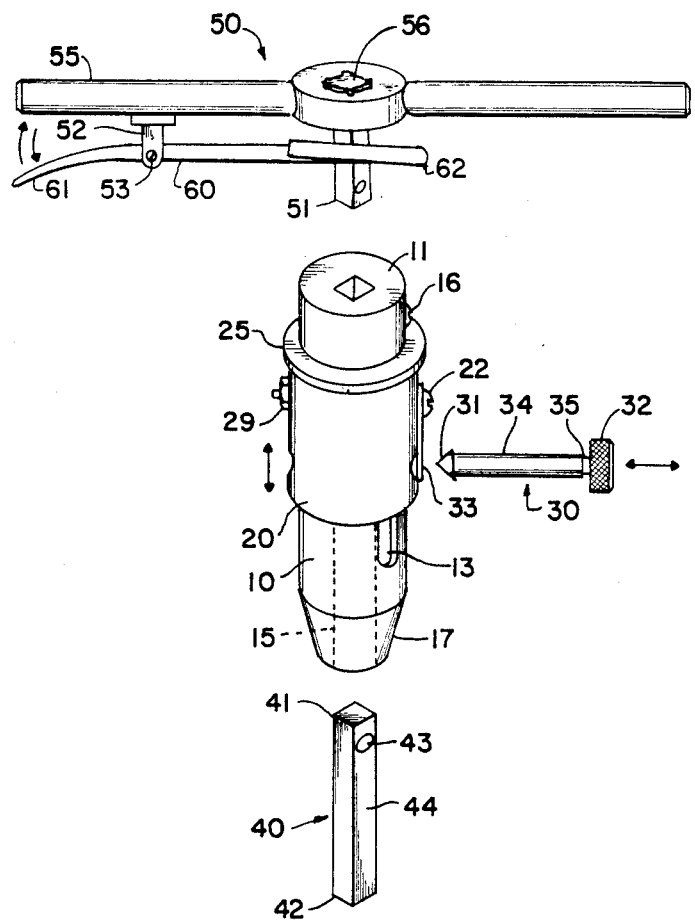
Fig. 3
Fig. 4
Fig. 5

SAFETY KEY FOR TOOLROOM LATHE CHUCK

FIELD OF THE INVENTION

This invention relates generally to keys for lathe chucks, and more particularly to safety keys for lathe chucks.

BACKGROUND OF THE INVENTION

Lathes typically employ chucks to removably attach a workpiece to the rotating shaft of the lathe. Several different types of chucks are known, the most popular being the so-called "4-jaw independent chuck" which has 4 reversible jaws, each of which may be independently adjusted, and the so-called "3-jaw universal chuck" which has 3 jaws which move simultaneously and automatically center the work. A removable key, commonly know as a "square end wrench", is typically used to tighten or loosen the chuck at the start or conclusion of the work. Such lathe chucks and such removable keys are well known in the art.

On occasion, an operator will forget to remove the key from the lathe chuck after loading the workpiece into the lathe and tightening the lathe chuck. Subsequent operation of the lathe causes the key to be forcibly ejected from the rotating chuck under centrifugal action, thereby endangering the operator, other bystanders, and/or the machine itself.

Similar situations can occur with other rotationally operative devices which employ chucks and removable keys, such as drills, drill presses and the like.

The foregoing safety problems have been recognized in machine shops and technical training and vocational schools where industrial shop safety is a major concern. Various safety key devices have been suggested to insure automatic disengagement of the key from the chuck when the key is released by the user. See, for example, U.S. Pat. Nos. 1489976, 2215621, 2387981, 2388414, 2442717, 2598119, 2609719, 2618995, 2660081, 2690690, 2807732, 3174365, 3457813, 3504580, 3673895, 3686985, 3728038, 3869943, 3977686, 4085943, 4111079, 4157836, 4324512, and 4395171, U.K. Patent Applications Nos. 2069379A and 2157204A, French Patent No. 679601, German Patent No. 2259649 and Swiss Patent No. 141368.

Unfortunately, all of the foregoing safety key devices are believed to suffer from one or more disadvantages. Many of these devices suffer from the disadvantage that they require an operator to continually exert pressure axially downward as the safety key device engages the chuck so as to allow a leading tip of the key to project outward from the remainder of the key and thereby prevent the safety key from ejecting itself from the chuck during use. Continually exerting pressure axially downward during rotation of the safety key device may require unnatural body movement by the operator which can be inconvenient. The inconvenience of having to maintain this awkward axially downward pressure during use is believed to have caused many prior art safety key devices to fall into disuse.

OBJECTS OF THE INVENTION

Accordingly, one object of the present invention is to provide a manually-operated, self-ejecting safety key for a lathe chuck which does not require the operator to exert pressure axially downward so as to prevent the key from ejecting itself from the chuck during use.

Another object of the present invention is to provide a manually-operated, self-ejecting safety key for a lathe chuck which utilizes the operator's natural tendency to squeezingly grip the handle of the lathe key during use.

Another object of the present invention is to provide a manually-operated, self-ejecting safety key for a lathe chuck wherein the key member will protrude from the remainder of the safety key as a result of an operator squeezingly gripping a lever located radially away from the axis of rotation of the key, and wherein the key member does not protrude from the remainder of the safety key when that lever is released.

Still another object of the present invention is to provide a safety key which can be used with other rotationally operative devices employing chucks and keys, such as drills, drill presses and the like.

Yet another object of the present invention is to provide a safety key employing a ratchet mechanism.

SUMMARY OF THE INVENTION

These and other objects of the present invention are achieved through a novel safety key comprising (1) a housing having a top end, a bottom end, and an internal bore opening on the bottom end and extending towards the top end, (2) a sleeve concentrically surrounding the housing and axially slidable thereon between a first position and a second position, (3) handle means fixedly or removably connected to and extending transversely to the top end of the housing, (4) a key member movably received in the internal bore of the housing at the bottom end thereof, (5) securing means for securing the key member to the sleeve, (6) spring means for biasing the sleeve into its first position when no axially downward pressure is applied to the sleeve, whereby the key member will be substantially completely withdrawn into the internal bore of the housing, and (7) lever means attached to the handle means for applying axially downward pressure to the sleeve, the lever means being adapted to provide downward pressure to the sleeve when the lever means are moved towards said handle means, whereby the sleeve may be moved axially downward along the housing from its first position towards its second position so that the bottom end of the key member will protrude from the housing.

BRIEF DESCRIPTION OF THE DRAWINGS

These and other objects and features of the present invention will be more fully disclosed or rendered obvious in the following detailed description of the preferred embodiment of the invention, which is to be considered together with the accompanying drawings wherein like numbers refer to like parts, and further wherein:

FIG. 3 is a partially exploded view of the same safety key, with the safety key of FIG. 3 bearing minor modifications from the safety key of FIGS. 1 and 2;

FIG. 4 is a partial side view showing a modified form of safety key; and

FIG. 5 is a partial side view showing yet another modified form of safety key.

DETAILED DESCRIPTION OF THE PREFERRED EMBODIMENT

Figure 1:
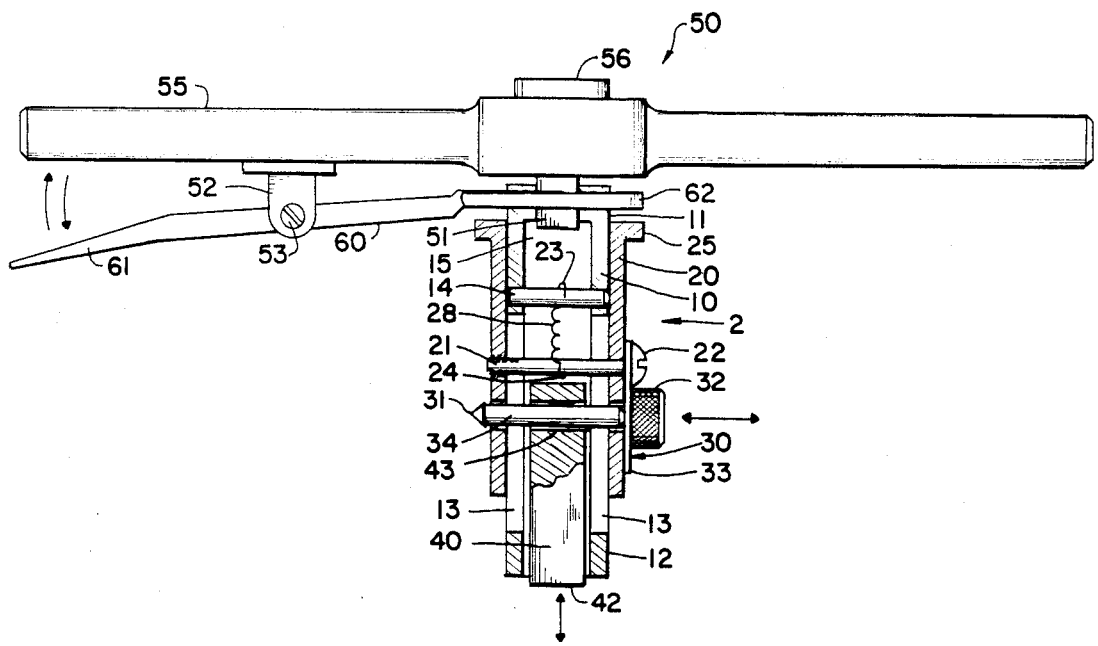
FIG. 1 is a side view in elevation, partially in section, of the safety key which comprises the preferred embodiment of the present invention.

Referring first to FIG. 1, there is shown a safety key 2 formed in accordance with the present invention. Key 2 has a centrally located hollow cylindrical housing 10. Housing 10 has a top end 11, a bottom end 12 and two diametrically opposed, axially extending side slots 13. A housing bar 14 is fixed to housing 10 and extends transversely through the housing's internal bore 15.

Cylindrical housing 10 is surrounded by a cylindrical sleeve 20 which is axially shorter than housing 10. Sleeve 20 makes a close sliding fit with housing 10 and is adapted to move axially along the housing, as will hereinafter be described in further detail. A spring bar 21 extends through sleeve 20 and slots 13 of housing 10. The spring bar has a screw head 22 and screws securely onto sleeve 20 in the manner shown in FIG. 1. Spring bar 21 rides in housing slots 13 as sleeve 20 moves up and down housing 10, as will hereinafter be described in further detail. An extension spring 28 connects spring bar 21 with housing bar 14. More particularly, spring 28 has an upper hook 23 which is attached to housing bar 14 and a lower hook 24 which is attached to spring bar 21. Extension spring 28 exerts an upward force on spring bar 21 so as to bias sleeve 20 upward into a first position, as shown in FIG. 1. Extension spring 28 maintains sleeve 20 in this first position relative to housing 10 until a downward force is exerted on sleeve 20, whereupon sleeve 20 may move downward along housing 10 so as to assume a second position, as will hereinafter be described in further detail.

A key member 40 is sized so as to fit into the bottom end of the housing's bore 15. Key member 40 has a top end 41 (FIG. 3), a bottom end 42 and an aperture 43 formed near its top end 41 (FIG. 3). Key member 40 is attached to sleeve 20 so that it will be held within bore 15 of housing 10 when sleeve 20 is in its aforementioned first position, and will be advanced out of the bottom end of the housing when sleeve 20 moves downward along the housing towards its second position, as will hereinafter be described in further detail. More particularly, a retaining pin 30 extends transversely through sleeve 20, key member 40 and slots 13 of housing 10. Pin 30 has a tapered front end 31 and a head 32. In use, the retaining pin 30 extends completely through both sides of sleeve 20 (and slots 13 of housing 10 and aperture 43 of key member 40), and its head 32 sits flush against a clip 33. Clip 33 exerts a downward force on shaft 34 of retaining pin 30 so that when clip 33 contacts a pin groove 35 (FIG. 3), retaining pin 30 will be secured to sleeve 20. It will be appreciated that retaining pin 30 rides in housing slots 13 as sleeve 20 moves up and down housing 10.

A handle 50 is connected to top end 11 of cylindrical housing 10 by an arm 51. Housing 10 has a screw 16 (FIG. 3) for securely attaching handle 50 to housing 10. Handle 50 comprises a standard ratchet mechanism 56 which transmits rotation to housing 10 when handle 50 is rotated in one direction, and transmits no rotation to housing 10 when handle 50 is rotated in the opposite direction. It is to be appreciated that ratchet mechanism 56 permits housing 10 to be turned in either a clockwise or counterclockwise direction, depending on the setting of the ratchet mechanism.

Handle 50 has a lever 60 that has an outer end 61 and an inner end 62. Lever 60 is connected to handle 50 by a bracket 52 and a screw 53. Lever 60 pivots around screw 53 so that upward movement of the lever's outer end 61 toward handle bar 55 causes inner end 62 to move downward against sleeve flange 25 of sleeve 20 (FIG. 3).

Safety key 2 is assembled in the manner shown in FIG. 1, with spring 28 biasing sleeve 20 upward toward handle 50 so that the sleeve is in its first position, whereby key member 40 is substantially completely withdrawn into internal bore 15 of housing 10.

In operation, the operator grips handle bar 55 and the outer end 61 of lever 60. When the operator desires to use the safety key to tighten or loosen a lathe chuck, ratchet mechanism 56 is appropriately set and then handle bar 55 and the lever's outer end 61 are squeezed together, thereby causing the lever's outer end 61 to move toward handle bar 55. This causes the lever's inner end 62 to move downward against the sleeve's flange 25, thereby causing sleeve 20 (and hence spring bar 21, clip 33, retaining pin 30 and key member 40) to move axially downward relative to housing 10, against the force of spring 28, until the bottom end 42 of key member 40 protrudes from bottom end 12 of housing 10. Sleeve 20 is then in its second position. The bottom end 42 of key member 40 will continue protruding from the bottom end of housing 10 as long as the operator continues to exert manual upward pressure on the outer end 61 of lever 60 as described above. The safety key can then be used to tighten or loosen a lathe chuck.

Upon release of the manual upward pressure on outer end 61 of lever 60, extension spring 28 will move sleeve 20 (and hence spring bar 21, clip 33, retaining pin 30 and key member 40) axially upward relative to housing 10. Thus, extension spring 28 will cause the bottom end 42 of key member 40 to be automatically withdrawn into internal bore 15 of housing 10. This forces the safety key to be disengaged from the lathe chuck. The operator is thereby prevented from accidentally leaving the safety key in the lathe chuck after tightening or loosening the chuck.

Figure 2:
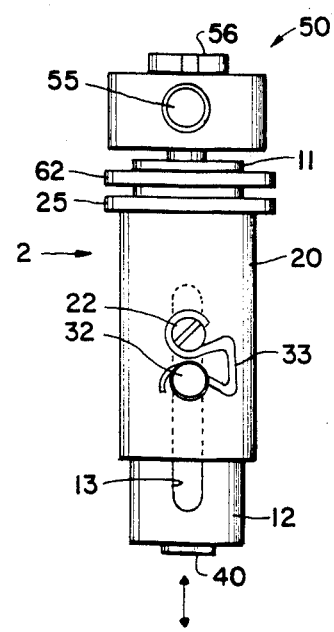
FIG. 2 is another side view of the same safety key, the safety key being rotated 90 degrees from the position shown in FIG. 1.
Figure 3A:
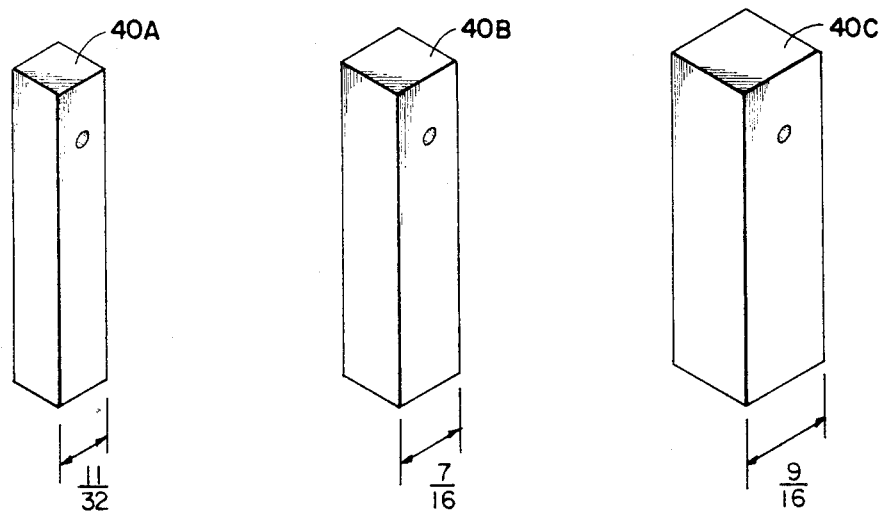
FIG. 3A shows three representative keys of different sizes which may be utilized with the present invention.

Key member 40 of safety key 2 can be easily exchanged for either a new key member of the same size or another key member of a different size. To change the key member, retaining pin 30 is simply removed from sleeve 20 (and housing 10) so that key member 40 is freed from the device. A substitute key member may then be inserted into bore 15 of cylindrical housing 10, and the retaining pin 30 replaced so that it extends through sleeve 20, cylindrical housing 10 and hole 43 of the new key member 40. Since lathes frequently require key members having a diameter of 11/32, 7/16 and 9/16 of an inch, it is contemplated that bore 15 of the present invention will be large enough to accept at least these three key sizes. By way of illustration, three different keys 40A, 40B and 40C, having diameters of 11/32, 17/16 and 9/16 of an inch, respectfully, are shown in FIG. 3A. Furthermore, many lathes require keys with a square cross-sectional area. Accordingly, key members with square end cross-sections are shown in FIGS. 1–3. However, the safety key of the present invention may also utilize key members having circular, hexagonal, octagonal and other polygonal cross-sectional shapes, as desired.

It will be appreciated that certain changes may be made to the self-ejecting safety key of FIGS. 1 and 2 without departing from the scope of the present invention. Thus, for example, FIG. 3 shows the cylindrical housing 10 having a tapered front end 17 and a nut 29 which secures spring bar 21 (see FIG. 1) to the sleeve 20 of the device. Additionally, inner end 62 of lever 60, which is shown as "U-shaped" in FIG. 3, may be forked or it may be made circular so that the lever's inner end 62 completely surrounds top end 11 of cylindrical housing 10.

Looking next at FIG. 4, it is also anticipated that the bottom end of housing 10 may be provided with a plurality of axial slots 95 and the bottom end of key member 40 might be provided with a round cross-sectional shape, whereby the safety key may be utilized with chucks of the sort typically found on drill chucks for lathe headstock spindles, drills and drill presses, i.e., a chuck of the sort shown in U.S. Pat. No. 2215621 or U.S. Pat. No. 2618995.

Looking next at FIG. 5, it is also anticipated that the key member 40A might be formed with a gear 97 adjacent its bottom end 42A, whereby the safety key may be utilized with chucks of the sort typically formed on drill chucks for lathe headstock spindles, drills and drill presses, i.e., a chuck of the sort shown in U.S. Pat. No. 2215621 or U.S. Pat. No. 2618995.

Still other changes obvious to persons skilled in the art may be made to the present invention without departing from the scope of the present invention.

What is claimed is:

1. A safety key comprising:
   a housing having a top end, a bottom end, and an internal passageway opening on said bottom end and extending towards said top end;
   a sleeve concentrically surrounding said housing and axially slidable thereon between a first position and a second position;
   a handle fixed to and extending transversely from said top end of said housing;
   a key member sized to be movably received in said internal passageway at said bottom end of said housing;
   securing means for securing said key member to said sleeve;
   spring means for biasing said sleeve into its said first position when no axially downward pressure is applied to said sleeve, whereby said key member will be substantially completely withdrawn into said internal passageway of said housing; and
   a lever comprising a first end, a second end, and a pivot located between said first end and said second end, said pivot being attached to said handle, said second end of said lever engaging said sleeve so that when said first end of said lever is moved towards said handle, said second end of said lever will move away from said handle and force said sleeve axially downward along said housing from its said first position towards its said second position so that a portion of said key member will protrude from said housing.

2. A safety key according to claim 1 wherein said housing comprises two diametrically opposed, axially extending slots, and further wherein said securing means comprises a retaining pin which extends transversely through said sleeve, said slots of said housing and said key member, said retaining pin being connected to said sleeve and said key member, and said retaining pin being sized to ride within said housing slots.

3. A safety key according to claim 2 wherein said key member is a first key member, and further wherein said retaining pin is manually disengageable from said sleeve and said first key member so as to permit said first key member to separate from the remainder of said safety key and permit a second key member to be received and secured in said internal passageway of said housing upon engagement of said retaining pin with said sleeve and said second key member.

4. A safety key according to claim 3 wherein said first and second key members are of different sizes.

5. A safety key according to claim 2 wherein said securing means further comprises a spring clip attached to said sleeve for securing said retaining pin to said sleeve.

6. A safety key according to claim 1 wherein said housing comprises two diametrically opposed, axially extending slots, and further wherein said spring means comprises a housing bar fixed to and extending transversely through said housing, a spring bar extending transversely through said sleeve and said slots of said housing, said spring bar being fixed to said sleeve, and a tension spring having a top hook connected to said housing bar and a bottom hook connected to said spring bar.

7. A safety key according to claim 1 wherein said handle is symmetrically bisected at the point where said handle is fixed to said top end of said housing.

8. A safety key according to claim 1 wherein said handle comprises ratchet means for (a) rotating said housing in a first direction when said handle is rotated in said first direction, and (b) permitting said housing to remain stationary when said handle is rotated in a second direction.

9. A safety key according to claim 1 wherein said second end of said lever is forked.

10. A safety key according to claim 1 wherein said second end of said lever has an aperture of sufficient radius to allow said top end of said housing to pass therethrough.

11. A safety key according to claim 1 wherein said key member comprises a top end and a bottom end, and further wherein said bottom end of said key member has a square cross-sectional shape.

12. A safety key according to claim 1 wherein said bottom end of said housing comprises a plurality of axially extending slots so as to engage counterpart portions of a chuck.

13. A safety key comprising:
    a housing having a top end, a bottom end, and an internal passageway opening on said bottom end and extending towards said top end;
    a sleeve concentrically surrounding said housing and axially slidable thereon between a first position and a second position;
    a handle;
    ratchet means fixed to said handle and said top end of said housing for (a) rotating said housing in a first direction when said handle is rotated in said first direction, and (b) permitting said housing to remain stationary when said handle is rotated in a second direction, said ratchet means being fixed to said handle and said top end of said housing so that said handle extends transversely from said top end of said housing;
    a key member sized to be movably received in said internal passageway at said bottom end of said housing;
    securing means for securing said key member to said sleeve;
    spring means for biasing said sleeve into its said first position when no axially downward pressure is applied to said sleeve, whereby said key member will be substantially completely withdrawn into said internal passageway of said housing; and a lever comprising a first end, a second end, and a pivot located between said first end and said second end, said pivot being attached to said handle, said second end of said lever engaging said sleeve so that when said first end of said lever is moved towards said handle, said second end of said lever will move away from said handle and force said sleeve axially downward along said housing from its said first position towards its said second position so that a portion of said key member will protrude from said housing.

14. A safety key according to claim 13 wherein said housing comprises two diametrically opposed, axially extending slots, and further wherein said securing means comprises a retaining pin which extends transversely through said sleeve, said slots of said housing, and said key member, said retaining pin being connected to said sleeve and said key member, and said retaining pin being sized to ride within said housing slots.

15. A safety key according to claim 14 wherein said key member is a first key member, and further wherein said retaining pin is manually disengageable from said sleeve and said first key member so as to permit said first key member to separate from the remainder of said safety key and permit a second key member to be received and secured in said internal passageway of said housing upon engagement of said retaining pin with said sleeve and said second key member.

16. A safety key according to claim 15 wherein said first and second key members are of different sizes.

17. A safety key according to claim 14 wherein said securing means further comprises a spring clip attached to said sleeve for securing said retaining pin to said sleeve.

18. A safety key according to claim 13 wherein said housing comprises two diametrically opposed, axially extending slots, and further wherein said spring means comprises a housing bar fixed to and extending transversely through said housing, a spring bar extending transversely through said sleeve and said slots of said housing, said spring bar being fixed to said sleeve, and a tension spring having a top hook connected to said housing bar and a bottom hook connected to said spring bar.

19. A safety key according to claim 13 wherein said handle is symmetrically bisected at the point where said handle is fixed to said ratchet means.

20. A safety key according to claim 13 wherein said second end of said lever is forked.

21. A safety key according to claim 13 wherein said second end of said lever has an aperture of sufficient radius to allow said top end of said housing to pass therethrough.

22. A safety key according to claim 13 wherein said key member comprises a top end and a bottom end, and further wherein said bottom end of said key member has a square cross-sectional shape.

23. A safety key according to claim 13 wherein said bottom end of said housing comprises a plurality of axially extending slots so as to engage counterpart portions of a chuck.

24. A safety key comprising:
a housing having a top end, a bottom end, and an internal passageway opening on said bottom end and extending towards said top end, and further wherein said housing comprises two diametrically opposed, axially extending slots;
a sleeve concentrically surrounding said housing and axially slidable thereon between a first position and a second position;
a handle;
ratchet means fixed to said handle and said top end of said housing for (a) rotating said housing in a first direction when said handle is rotated in said first direction, and (b) permitting said housing to remain stationary when said handle is rotated in a second direction, said ratchet means being fixed to said handle and said top end of said housing so that said handle extends transversely from said top end of said housing;
a key member sized to be movably received in said internal passageway at said bottom end of said housing;
a retaining pin extending transversely through said sleeve, said slots of said housing, and said key member, said retaining pin being connected to said sleeve and said key member, and said retaining pin being sized to ride within said housing slots;
a housing bar fixed to and extending transversely through said housing;
a spring bar extending transversely through said sleeve and said slots of said housing, said spring bar being fixed to said sleeve;
a tension spring having a top hook connected to said housing bar and a bottom hook connected to said spring bar, said tension spring being adapted to bias said sleeve into its said first position when no axially downward pressure is applied to said sleeve; and
a lever comprising a first end, a second end, and a pivot attached to said handle, said second end of said lever engaging said sleeve so that when said first end of said lever is moved towards said handle, said second end of said lever will cause said sleeve to be moved axially downward along said housing from its said first position towards its said second position so that a portion of said key member will protrude from said housing.

* * * * *